United States Patent
Gajavelly et al.

(10) Patent No.: US 10,540,468 B1
(45) Date of Patent: Jan. 21, 2020

(54) VERIFICATION COMPLEXITY REDUCTION VIA RANGE-PRESERVING INPUT-TO-CONSTANT CONVERSION

(71) Applicant: INTERNATIONAL BUSINESS MACHINES CORPORATION, Armonk, NY (US)

(72) Inventors: Raj Kumar Gajavelly, Warangal (IN); Jason R. Baumgartner, Austin, TX (US); Robert L. Kanzelman, Rochester, MN (US); Alexander Ivrii, Haifa (IL); Pradeep Kumar Nalla, Sheffield (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/032,786

(22) Filed: Jul. 11, 2018

(51) Int. Cl.
*G06F 17/50* (2006.01)

(52) U.S. Cl.
CPC ........ *G06F 17/505* (2013.01); *G06F 17/5022* (2013.01); *G06F 2217/86* (2013.01)

(58) Field of Classification Search
CPC .......................... G06F 17/505; G06F 17/5022
USPC ........................................ 716/104, 106–107
See application file for complete search history.

(56) References Cited

U.S. PATENT DOCUMENTS

| | | |
|---|---|---|
| 5,537,580 A | 7/1996 | Giomi et al. |
| 5,752,000 A | 5/1998 | McGreer et al. |
| 5,774,370 A | 6/1998 | Giomi et al. |
| 6,077,305 A | 6/2000 | Cheng et al. |
| 6,370,495 B1 | 4/2002 | Weddle et al. |
| 6,698,001 B2 | 2/2004 | Bae |
| 6,704,911 B2 | 3/2004 | Yang |
| 6,836,877 B1 | 12/2004 | Dupenloup |
| 6,842,750 B2 | 1/2005 | Andreev et al. |
| 6,931,611 B2 | 8/2005 | Martin et al. |
| 7,310,790 B2 | 12/2007 | Melham et al. |
| 7,350,179 B2 | 3/2008 | Baumgartner et al. |
| 7,363,097 B2 | 4/2008 | Sakai |

(Continued)

FOREIGN PATENT DOCUMENTS

WO WO1996023263 A1 8/1996

OTHER PUBLICATIONS

Case, et al., "Enhanced Verification by Temporal Decomposition", Formal Methods in Computer-Aided Design (FMCAD) Conference, Nov. 2009, 8 pages (pp. 1-8 in pdf), Austin TX.

(Continued)

*Primary Examiner* — Stacy Whitmore
(74) *Attorney, Agent, or Firm* — Scott S. Dobson

(57) ABSTRACT

A logic verification program, method and system provide an efficient behavior when verifying large logic designs. The logic is partitioned by cut-nodes that dominate two or more RANDOMS and a check is performed for a given cut-node to determine whether any of the dominated RANDOMS can be merged to a constant by performing satisfiability checks with each RANDOM merged to a constant, to determine whether a range of output values for the given cut-node has been reduced by merging the RANDOM. If the range is not reduced, the RANDOM can be added to the set of mergeable RANDOMS along with the corresponding constant value. If the range has been reduced, the opposite constant value is tried for a node and if the range is reduced for both constants, then the cut-node is abandoned for merging that dominated RANDOM and the next dominated RANDOM is tried.

20 Claims, 8 Drawing Sheets

(56) References Cited

U.S. PATENT DOCUMENTS

| | | | |
|---|---|---|---|
| 7,380,222 | B2 | 5/2008 | Baumgartner et al. |
| 7,428,712 | B1 | 9/2008 | Singh et al. |
| 7,464,015 | B2 | 12/2008 | Iwashita |
| 7,475,370 | B2 | 1/2009 | Baumgartner et al. |
| 7,523,029 | B2 | 4/2009 | Takenaka |
| 7,882,470 | B2 | 2/2011 | Baumgartner et al. |
| 7,913,205 | B2 | 3/2011 | Baumgartner et al. |
| 8,156,462 | B2 | 4/2012 | Moon |
| 8,171,437 | B2 | 5/2012 | Baumgartner et al. |
| 8,181,134 | B2 | 5/2012 | Baumgartner et al. |
| 8,201,115 | B2 | 6/2012 | Baumgartner et al. |
| 8,201,117 | B2 | 6/2012 | Baumgartner et al. |
| 8,327,302 | B2 | 12/2012 | Baumgartner et al. |
| 8,359,183 | B1 | 1/2013 | Aldrich |
| 8,418,093 | B2 | 4/2013 | Baumgartner et al. |
| 8,418,119 | B2 | 4/2013 | Case et al. |
| 9,489,477 | B2 | 11/2016 | Bjesse |
| 2012/0290282 | A1 | 11/2012 | Case et al. |

OTHER PUBLICATIONS

Wilson, et al., "Reliable Verification Using Symbolic Simulation with Scalar Values", Design Automation Conference (DAC) Jun. 2000, 6 pages (pp. 1-6 in pdf), Los Angeles, CA.

Cheng, "Symbolic Trajectory Evaluation (STE)", website, page downloaded from http://www.eleceng.adelaide.edu.au/personal/acheng/public/ste/ste.html on Apr. 21, 2011.

Velev, et al., "Efficient Modeling of Memory Arrays in Symbolic Ternary Simulation", TACAS '98 Portugal, Mar. 1998, pp. 1-15.

Wilson, et al., "Symbolic Simulation with Approximate Values", Computer Science Dept, Nov. 2000, pp. 1-16 (16 pages in pdf), Carnegie Mellon University.

Bryant, et al., "Formal Hardware Verification by Symbolic Ternary Trajectory Evaluation", $28^{th}$ ACM/IEEE Design Automation Conference, 1991, pp. 397-402.

"Symbolic Trajectory Evaluation (STE)", downloaded from: http://augean.ua.oz.au/personal/acheng/public/ste/ste.html on Jan. 24, 2014, pp. 1-8 (8 pages in pdf).

Daily, "Sequential Logic", EE108 Class Notes, Chapters 14-16, 2007, pp. 235-299.

Mathur, et al., "Improved Merging of Datapath Operators using Information Content and Required Precision Analysis", DAC 2001, Jun. 18-22, 2001, 6 pages (pp. 1-6 in pdf), ACM, 2001, US.

Kuehlmann, et al.,"Robust Boolean Reasoning for Equivalence Checking and Functional Property Verification", IEEE Transactions on Computer-Aided Design of Integrated Circuits and Systems, vol. 21, No. 12, Dec. 2002, pp. 1377-1394.

Baumgartner, et al.,"Maximal Input Reduction of Sequential Netlists via Synergistic Reparameterization and Localization Strategies", CHARME 2005, IBM Systems & Technology Group, 15 pages (pp. 1-15 in pdf), Austin, US.

Een, et al., "A Fast Reparameterization Procedure", 2013 International Workshop on Design and Implementaion of Formal Tools and Systems, 2013, Berkeley Verification and Synthesis Research Center, University of California, pp. 1-5, Berkeley, US.

Lengauer, et al., "A Fast Algorithm for Finding Dominators in a Flowgraph", ACM Transactions on Progamming Languages and Systems, vol. 1, No. 1, Jul. 1979, pp. 121-141, Stanford University, US.

Edmonds, et al., "Theoretical Improvements in Algorithmic Efficiency for Network Flow Problems", Journal of the Association for Computing Machinery, vol. 19, No. 2, Apr. 1972, pp. 248-264, US.

Cooper, et al., "A Simple, Fast Dominance Algorithm", Dept of Computer Science, Rice University, Rice Computer Science TR-06-33870, 2001, pp. 1-15, Houston, US.

VERIFICATION COMPLEXITY REDUCTION VIA RANGE-PRESERVING INPUT-TO-CONSTANT CONVERSION

BACKGROUND OF THE INVENTION

1. Field of the Invention

The present invention is related to circuit verification techniques that reduce computational and system memory burdens, and more specifically to logic verification programs, methods and systems that search out and remove dependencies on non-dominated, undefined input values in order to enhance circuit simulation, perform netlist reduction and perform other model simplification.

2. Description of Related Art

Modern hardware, software, and hardware/software co-design components have become very large and complex, leading to an increasing diversity of functionality. Such large and complex designs are further complicated by multi-dimensional optimization criteria including delay, area, and power optimizations, as well as the inclusion of additional logic to increase testability, reliability, and configurability. The verification of such complex systems has grown to be extremely challenging if not intractable, with verification resource demands typically having eclipsed the cost of all other aspects of the production of such systems, while in addition frequently increasing the risk of missing subtle design flaws during verification. Design flaws, particularly those that occur in dedicated hardware, can be very expensive to repair if exposed late in the product development cycle, causing product delays which may eliminate or decrease the profitability of a design, while risking damage due to erroneous computations, including risk to human lives.

Verification typically involves exponentially-growing complexity with respect to the size of the design under verification. Some verification techniques are more seriously hindered by certain design components than others. For example, techniques that leverage a canonical representation of design functionality may be more hindered by the number of primary inputs of the design than other size metrics, since a functional view (e.g., evaluation of a truth table) increases exponentially in size in response to an increased number of undefined inputs to the design. The number of gates in a design often imposes a significant impact on the complexity of analysis of the design functionality, since a large number of gates is typical of a more complicated functionality of the design. Verification techniques that simulate logic to determine a set of reachable states of a design are typically greatly impacted by the number of state-retaining elements present in the design. A "testbench" refers to the composition of a design under verification along with a synthesized variant of any input assumptions and the design properties to be verified. "Equivalence checking" refers to a type of verification which attempts to establish functional equivalence of the outputs of two designs under identical input stimulus.

Techniques that reduce the size of the design under verification frequently have a tremendously positive impact on the tractability of the verification task. Such techniques can thereby significantly reduce the expense of verification and thus improve the cost-effectiveness of a logic design, reducing the risk of missed design flaws, while enabling verification plan closure with reduced effort and a decreased resource demand. Advanced synthesis techniques often rely heavily upon scalable verification techniques, first to establish the validity of an optimization, and second to boost the scalability of equivalence checking to confirm that synthesis does not alter design behavior. Therefore, it would be desirable to improve the quality, speed and size of logic synthesis, and thereby to further improve the cost-effectiveness of a given logic design.

BRIEF SUMMARY OF THE INVENTION

The invention is embodied in a method, computer system and computer program product that perform verification of a logical design. The computer system is a computer system executing program instructions for carrying out the method and the computer program product is a program for carrying out the method.

The method is a method of verifying a logic design that identifies a set of one or more cut-nodes that are output nodes of corresponding partitions of a logic representation in a memory of the computer system that represents the logic design. The identified cut-nodes each or together dominate at least two corresponding RANDOMS that are input to the corresponding partitions of the logic. After identifying the set of one or more cut-nodes, the method next identifies a set of RANDOMS corresponding to a given cut-node that can individually be merged to either FALSE or TRUE without altering a range of values producible at the given cut-node over non-dominated RANDOMS, along with identifying a constant corresponding to FALSE or TRUE for individual ones of the identified set of RANDOMS for the corresponding cut-node. After identifying the set of RANDOMS that can be merged, the individual RANDOMS are replaced within the identified set of RANDOMS with the corresponding constant for the individual RANDOMS in the corresponding partition of the logic represented in the memory of the computer system, to merge the identified RANDOMS to reduce the number of the input RANDOMS to the corresponding partition of the logic. The verification of the logic across non-dominated RANDOMS and non-merged RANDOMS is then performed to complete the verification.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

Figure 1:
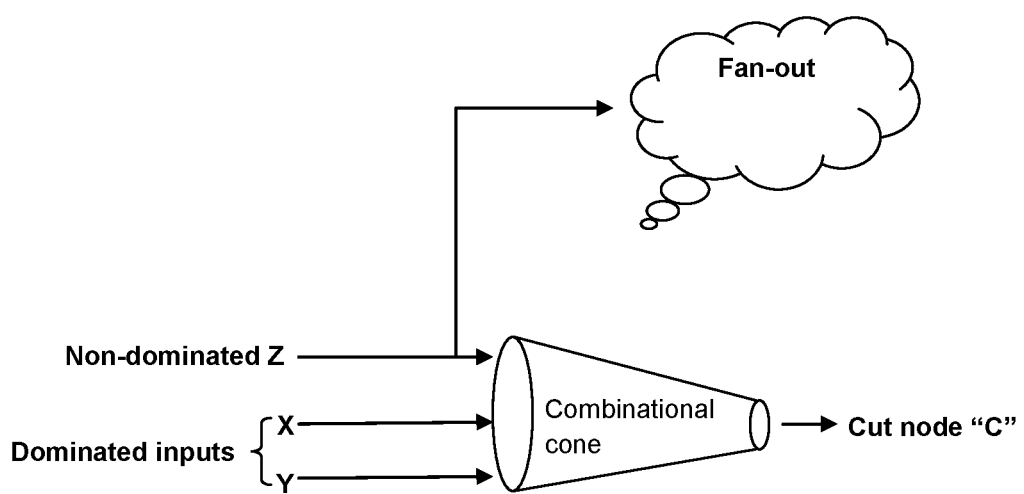
FIG. 1 is a pictorial diagram depicting combinational logic cone partitioning as used in the method of FIG. 3.

This disclosure presents novel techniques that reduce the complexity of verification through reducing the size of the testbench. By merging certain primary inputs to constant values, constant propagation and other logic optimization techniques can be applied to further reduce testbench size and verification complexity. Specifically, the disclosed approach identifies the set of primary inputs which are dominated by certain intermediate nodes (dominator set) and determines whether the primary inputs can be merged to 0/1, i.e., replaced with a true or false constant value, by comparing range computations on the dominator set (i.e., the set of producible values at the dominator set), with and without candidate reductions. The methods disclosed herein can be considered as computing and comparing two ranges: first leaving the primary inputs intact, then re-computing after merging the primary inputs to either 0/1, and if these ranges are equal, the corresponding primary inputs may be merged without altering verification results on the given testbench. However, one particularly novel innovation of the disclosed techniques is that the techniques do not require range computation whatsoever, instead only comparing the differences between the two logic cones with vs. without a candidate merge performed.

The techniques disclosed herein are proposed as a component of a transformation-based verification system, such that this approach can benefit in utility from the application of prior transformations. Similarly, subsequent transformations may be significantly more effective after this transformation, and generally there may be value from iterating the transformations disclosed herein with others to yield increasing reductions. In a verification context, the benefits of the techniques include (i) a reduction in the number of combinational gates in a logic design, (ii) a reduction on the number of fan out references to certain state variables, including a migration of logic from being "sequentially driven" to being "combinationally driven", which enables more efficient reasoning and reduction capability through other transformations, and (iii) a reduction in the number of input variables and potentially also of state variables. Because verification algorithms are an essential component of advanced synthesis tools (e.g., those computing redundant gates, or "don't care" conditions that can be used to identify clock gating opportunities): these techniques can also be used for area, power, and delay reduction in a synthesis flow. As such, this invention may contribute to hardware development, CAD systems with verification or in synthesis tools.

The above-described techniques are embodied in several components, the first of which provides a method to efficiently merge certain inputs to constants using single-node dominator-based cut analysis. A second alternative method, or that may be used across portions of a design, merges certain inputs to constants using multi-output min-cut-based dominator analysis. Finally, a method to legalize verification results obtained using one or both of the above logic reduction techniques is implemented, for example to map a counterexample trace obtained on a reduced netlist to one consistent with the original netlist. In general, within the context of logic optimization or combinational equivalence checking, the techniques disclosure herein demonstrate that if a specified "constraint" directly implies that a primary input can be merged either 0/1, then the primary input will be merged accordingly. A structural application of constraints to enable merging: e.g., if merging an AND gate to constant 1, all inputs to that AND gate may be merged to constant 1; if merging an XOR gate to a constant, the inputs to that XOR gate may be merged together (possibly inverted), in cases enabling primary inputs to be merged.

In order to commence verification and potential reductions in the logic, a netlist format is used to represent logic systems under verification. The netlist contains a directed graph with vertices representing gates, and edges representing interconnections between those gates. Each gate has zero or more input edges, indicating which gates define their semantic behavior, and zero or more output edges, indicating that other gates have their semantic behavior defined by the instant gate. Each gate has an associated function, such as constants, primary inputs (hereafter referred to as RANDOM gates), combinational logic such as AND gates, simple sequential elements (hereafter referred to as registers), and memory arrays. Registers have two associated components: their next-state functions, and their initial-value functions. Both are represented as other gates in the graph. Semantically, for a given register, the value appearing at its initial-value gate at time "0" ("initialization" or "reset" time) will be applied as the value of the register itself; the value appearing at its next-state function gate at time "i" will be applied to the register itself at time "i+1". The initial value of register "r" is sometimes referred to as "initial-value(r)" and the next-state function of "r" as "next-state(r)". In a verification context, certain gates are labeled as "properties", representing a verification objective where the goal is to find a trace showing a logical "1" applied to the property gate, or to prove that no such assertion of the property is possible. Certain gates may be labelled as "constraints", where any legal trace illustrating a property violation must satisfy (evaluate to 1) every constraint for every time step in the trace. It is assumed that a netlist is a self-contained representation of a verification testbench within a verification setting, including a composition of the design under verification with any relevant properties and input assumptions. The "observable gates" refer to property and constraint gates, i.e., those gates whose values are directly essential to a verification problem. In a logic synthesis setting, the observable gates would include primary outputs of a design under verification. Hereafter, the set of all gates whose function is essential to preserve in verification or synthesis are referred to as "observables." A "trace" represents a sequence of valuations to the gates of a netlist over time, beginning from an initial state and consistent with the semantics of the gates.

A common netlist format that is employed as an example in the illustrative embodiments disclosed herein is the And Inverter Graph (AIG), in which all combinational gates are decomposed into 2-input AND gates (Boolean conjunction), and "inversions" are denoted by an attribute on a gate reference, but an AIG implementation is not a requirement of the disclosed embodiments, and the techniques disclosed herein are applicable to other forms of netlist representations. In the AIG netlist format illustrated herein, function "IDX(gate)" returns a value of "gate" if "gate" is not an inverter, otherwise IDX(gate) returns a value provided from the gate at the input of an inverter if "gate" is an inverter. In an AIG, the IDX(gate) function merely clears the "inverted" attribute on a gate reference. In this disclosure, using graph theory terminology, node A is defined as dominated by node B if all the directed paths from A to observables pass through B. A cut refers to the set of nodes, which when removed from the graph, split the netlist into disjoint partitions such that there does not exist a path from certain dominated gates to observables. The number of gates included in the cut is sometimes referred to as the "cut width." For example, a gate C that is present in the fan-in of node B is non-dominated by B if there exists at least one path from C to the observables that does not pass through node B. A RANDOM, in the context of a particular cut, is an input value that is undefined, i.e., an input from a logic gate or state-holding logic, such as a register, that has not been assigned a constant value. Constant values in the binary logic used in this description are assumed to be TRUE or FALSE. The range of node B is the set of all possible Boolean values that are producible at B when simulated with Boolean valuations to RANDOM gates, which may be a function of register valuations as mentioned above. The techniques of the present disclosure perform strictly combinational analysis, i.e. treating registers as cut points at which the next state functions of state elements will be considered as observables for analyzing and generating dominator trees. The registers themselves are treated as RANDOM gates. The disclosed techniques will only attempt to merge RANDOM gates, so that registers are treated as non-dominated for any cut in which they provide a RANDOM input value.

Referring to FIG. 1, an example netlist for a cut-node C is illustrated, in which x and y are dominated inputs and z is a non-dominated input and which connects to fan out logic that does not pass through cut-node C. Typical existing techniques for elimination of combinatorial logic in a netlist operate by: 1) Identifying a logic cut adjacent to the RANDOMs, where the number of dominated RANDOMs is greater than the "cut width", which generally search for cut-nodes that only dominate a single RANDOM; and 2) Computing the range of the cut, i.e. the values producible at the cut as a function of any registers or non-dominated RANDOMs that may fan out to the cut. The range computation is generally performed with Binary Decision Diagrams (BDDs) or with truth tables. 3) Synthesizing the computed range, using fresh RANDOMs ("parametric variables") to represent the non-determinism of the range. In contrary to existing reparameterization methods as described above, the techniques disclosed herein do not perform full range computations, as new logic is not being synthesized. Rather, the techniques disclosed herein search for RANDOMs that can be merged to constant while preserving the range values. The resulting transformation provides a substantial speedup in practice. Computing a range is generally computationally expensive, and involves more computation than is necessary compared to the netlist reduction provided by the techniques disclosed herein are used.

In contrast, the high level netlist optimization of the techniques disclosed herein operate as follows: 1) Identify a logic cut adjacent to the RANDOMs, where at least 2 RANDOMs are dominated by the cut. The disclosed techniques explore the possibility of merging one of the RANDOMs. 2) determine whether or not the original range is identical to a range of the modified logic, i.e, the range produced when any of the dominated RANDOMs is merged to a constant. If the range is identical, the "mergeable" input RANDOM is added to a collection of RANDOMS stored in a merged input array (for trace lifting) and the RANDOM is merged to the constant. The process is repeated for different cut-nodes and different RANDOM gates. Thus, the techniques of the disclosed embodiments effectively reduce the netlist without using the range computation and synthesis steps of existing algorithms as described above. The evaluation performed in step 2 may be expressed as a Quantified Boolean Formula (QBF):

$$\forall x,y,z \exists y1 F(x,y,z)=F(0,y1,z) \text{ for merging } x \text{ to } 0;$$

$$\forall x,y,z \exists y1 F(x,y,z)=F(1,y1,z) \text{ for merging } x \text{ to } 1;$$

in which F is the collection of cut-node(s) at the tip of a logic cone defining the cut-nodes, including dominated RANDOMs x,y and non-dominated nodes z (which may be registers, RANDOM gates, or other gates). Unfortunately, general QBF solving is often computationally non-scalable: the techniques disclosed herein further provide a solution for solving the QBF check presented herein.

While the above relationships can be approximated by checking whether the cofactor-0 range is equal to cofactor-1 range, and if so, merging the dominated input to either constant. However, in the specific embodiments disclosed below, a stronger solution is implemented, as the comparison of ranges for both cofactors only identifies completely unobservable RANDOMs with respect to the selected cut. For example, in a simple case in which nodeX=input1 XOR input2 and both inputs are dominated by nodeX, either of the inputs can be merged to either constant while preserving the range of nodeX, but the opportunity to perform the above merge cannot be identified by the cofactor check. The embodiments disclosed below find cases in which the dominated RANDOM is observable, but merging the dominated RANDOM to a given constant does not restrict the cut range. The pseudo-code given below provides a solution for merging RANDOMs dominated by individual nodes to a constant determined by testing whether the RANDOMs can be merged without restricting the range of observed cut-node output values.

DominatorBased_MergeRANDOMsToConstants(Netlist N, Observables T, MAX_CUT_SIZE)
1. merged_inputs={ }, N'=N
2. cut_list=computeCutNodesList(N', T)// using [6], compute a dominator tree, convert it to a topogical list from shallower to deeper dominator nodes
3. for each cut node in cut_list{
4. if cut_node is marked with unsuitable_flag, then goto3
5. dom_set=list of RANDOMs dominated by cut_node
6. non_dom_set=list of RANDOMs and registers or other internal gates in the fanin of cut_node, that are non-dominated by cut_node
7. if(dom_set.size( )<2) then goto3// can merge only if there are at least 2 dominated inputs
8. elseif(dom_set.size( )+non_dom_set.size( )=MAX_CUT_ SIZE) then {
9. mark nodes in cut_list that are in the fanout of cut_node, with unsuitable_flag
10. goto3// in case cut has large fan in cone
11. }
12. else{
13. merges=FindPossibleMergesToConstant(cut_node,dom_set,non_dom_set, N')
14. i=0
15. while(merges.size( )>i){

16. merged_inputs.insert(<merges.var,merges.value>)
17. N'=Merge input merges.var to merges.value in netlist N'
18. i+=1
19. }//while
20. }// else
21. }// for loop
22. return N' and merged_inputs.

Figure 2:
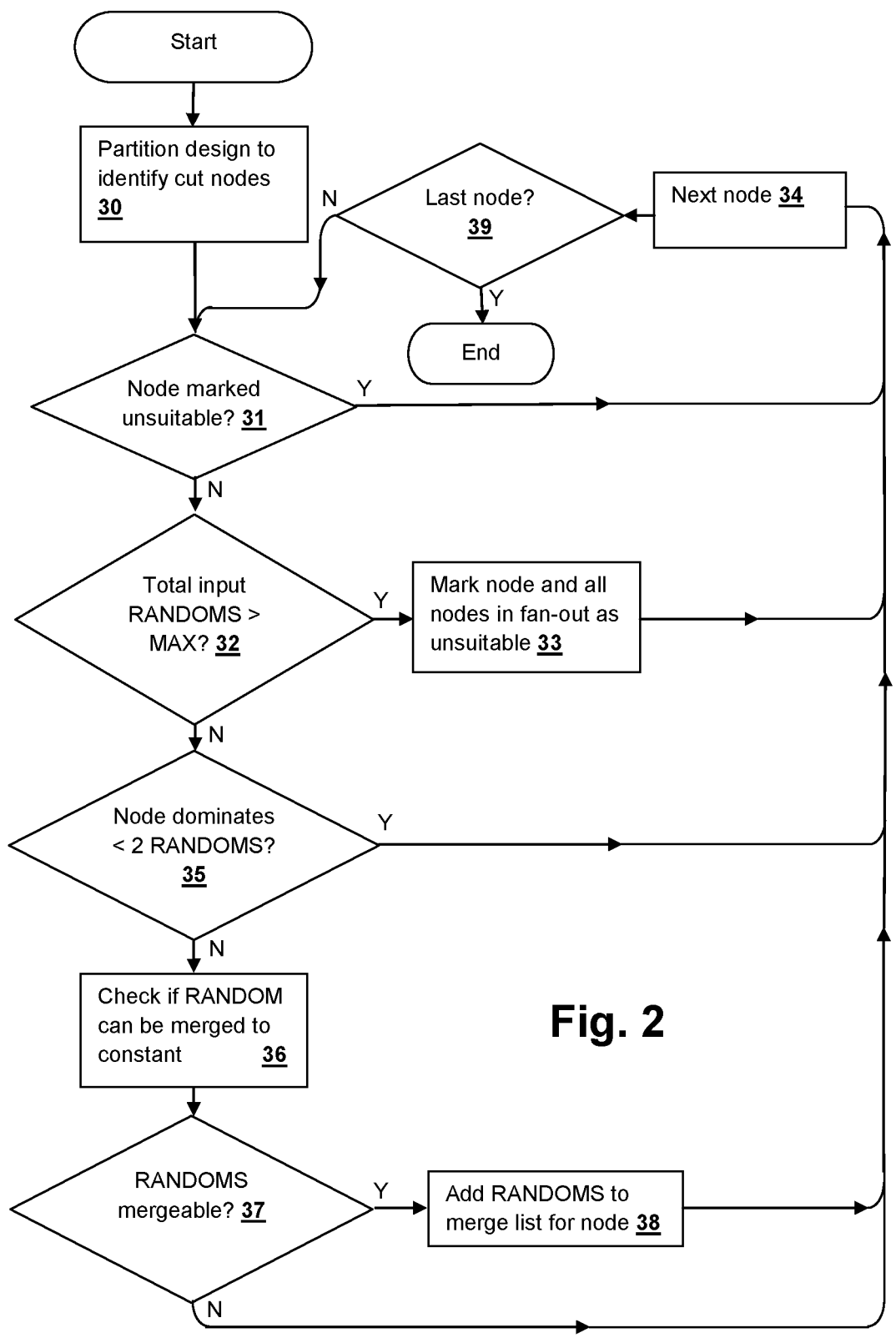
FIG. 2 is a flow chart depicting a method in accordance with an embodiment of the disclosure.

Referring to FIG. 2, a method according to an embodiment of the disclosure is illustrated, in accordance with the pseudo-code listing provided above. First, a logic design is partitioned to identify the cut-nodes that will be optimized (step 30). As described above, the cut-nodes for optimization by the methods herein are those that dominate two or more RANDOMS and that are not marked as unsuitable due to a maximum number of input RANDOMS being exceeded for the logic cone associated with the cut-node. If the cut-node is previously marked as unsuitable (decision 31), then the method moves on to the next cut-node (step 34), otherwise, if the number of input RANDOMS exceeds the maximum threshold (decision 32), the cut-node and all nodes in the fan-out of the cut-node are marked as unsuitable (step 33) and the method moves on to the next cut-node (step 34). Next, if the number of RANDOMs dominated by the cut-node is less than two (decision 35) the method moves on to the next cut-node (step 34). If the number of RANDOMs dominated by the cut-node is greater than or equal to two (decision 35), checks are performed to determine whether any of the RANDOMs can be merged to a constant (step 36). If one or more of the RANDOMs are mergeable (step 37), then the identified RANDOM are added to a merge list for the cut-node (step 38). After performing the check in step 37, the method moves on to the next cut-node (step 34) until the last cut-node of the partition has been processed (decision 39).

The above-described process takes a netlist N and observables as input, and merges RANDOMs to constant whenever possible, and returns the optimized netlist N' with the list of RANDOMs with the constant value (TRUE or FALSE) to which they are mergeable to a list of merged nodes (merged_inputs) for trace lifting. First, the process computes the set of possible dominator/cut-nodes list (referred as a "dominator tree" in literature) using a graph dominator algorithm, with RANDOMs as sources, and observables, including next-state and initial-value functions as sinks. The process converts the dominator tree into a topological list from shallower to deeper topological depth in method computeCutNodesList( ). The topological list is ordered in the above manner, since merging the nodes closer to the RANDOMs enhances recursive optimization over the deeper netlist nodes. Therefore the topological ordering offers a greater scalability and optimization opportunity. For each cut-node in the list, the process traverses a cone of influence and identifies the nodes that are dominated and non-dominated by this cut-node. The non-dominated gate set may often include RANDOM gates or registers not dominated by the chosen cut, though generally the non-dominated RANDOMs are also internal gates in the fan-out of non-dominated RANDOMs and registers which in turn fan out to logic in the fan-out of dominated inputs. Choosing the non-dominated set to include a minimal number of gates is often beneficial for computational efficiency of the techniques of the embodiments disclosed herein.

According to the process described above, if the number of dominated RANDOMS is at least 2, then the cut-node is a candidate for checking input merge possibility. When the number of nodes in the dominated and non-dominated lists is larger than MAX_CUT_SIZE threshold parameter, the process skips over such nodes since the computation of possible values at the cut node (range of the cut) can be complex. By marking the cut_node and nodes in cut_list that are also present in the combinational fan-out of cut_node with unsuitable_flag, the process excludes multiple structural traversal of uninteresting cut-nodes, as the cut-width of these nodes will certainly exceed MAX_CUT_SIZE threshold. In the pseudo-code given above, lines 9 and 10 perform this optimization. In contrast to prior techniques, since the process disclosed herein does not use truth tables, MAX_CUT_SIZE can be set to a value substantially larger than 8 cut-nodes without requiring excessive computational resources. If all of the above conditions are met for optimizing a cut-node, the lists of dominated and non-dominated RANDOMS are passed to the cut-node-checking algorithm encountered in step 36 of FIG. 2, which attempts an exhaustive analysis of merge opportunities on the RANDOMS in the dominated inputs list. Depending on the result of the check, i.e., if any RANDOMS are identified as mergeable, the RANDOMS are merged to the corresponding constant (TRUE or FALSE) as detected by the checking algorithm and the process continues to process other nodes in the cut_list.

Figure 3:
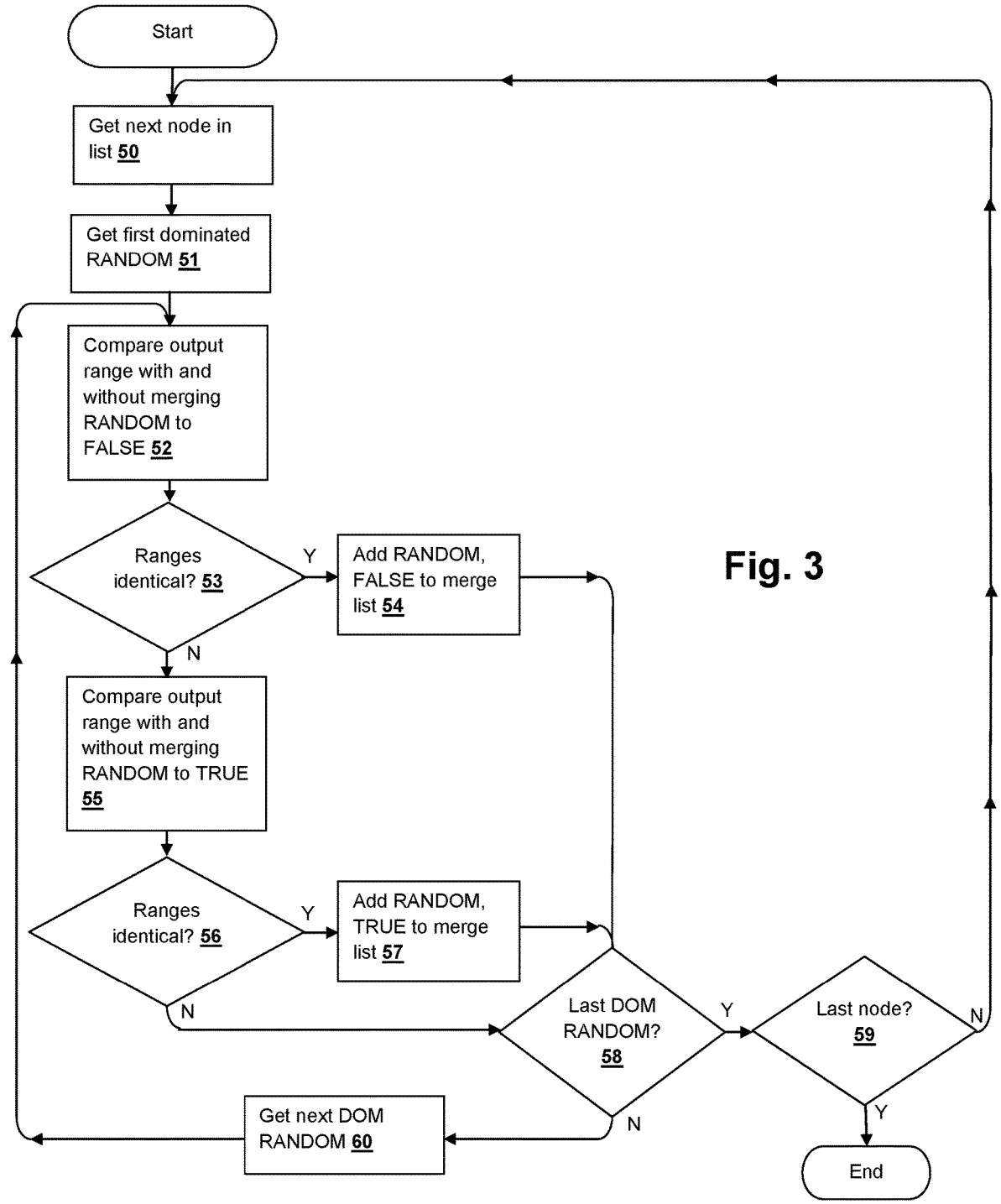
FIG. 3 is a flow chart depicting a method in accordance with an embodiment of the disclosure.

Referring to FIG. 3, a method according to an embodiment of the disclosure is illustrated that implements the check invoked in step 36 of FIG. 2, in accordance with the pseudo-code listing provided below. The process gets the next node in the list (step 50), which is the first node upon entering the check, and the first dominated RANDOM to be checked is retrieved (step 51). A satisfiability checker is used to compare the output ranges of the cut-node with and without merging the dominated RANDOM to FALSE (step 52) and if the ranges are identical under both conditions (decision 53), then the dominated RANDOM, the corresponding value FALSE are added to the merge list (step 54). Otherwise, the output ranges of the cut-node with and without merging the dominated RANDOM to TRUE are compared (step 55) and if the ranges are identical (decision 56), then the dominated RANDOM, the corresponding value TRUE are added to the merge list (step 57). Until the last dominated RANDOM has been processed (decision 58), the next dominated RANDOM is retrieved (step 60) and the process is repeated from step 52. Once the last dominated RANDOM has been processed (decision 58) in the case of the multi-cut-node processing described below with reference to FIGS. 5-6, the process returns at completion of checking the last node (decision 59). For the process described in FIG. 2, which processes one node at a time, decision 59 is always true (or skipped) and the process returns at completion of the dominator merge check.

FindPossibleMergesToConstant(cut_nodes, dom_set, non_dom_set, Netlist N)
01. merges={ };
02. RANGE={cut_nodes,non_dom_set}
03. CUT_X=logic driving RANGE
04. for each RANDOM in dom_set{
05. for each CONSTANT in {0,1}{
06. CUT_C=copy of CUT_X with RANDOM merged to CONSTANT
07. enumerated_set={ }
08. SAT1 Query:
(values(RANGE, CUT_X)!=values(RANGE, CUT_C)) AND
((values(RANGE, CUT_X)NOT INenumerated_set)?
09. if(SAT1 Query is UNSAT){// canmerge RANDOM to CONSTANT

```
10. push <var=RANDOM, value=CONSTANT>into
    merges
11. constrain RANDOM to CONSTANT
12. add RANDOM to cut_X. remove RANDOM from
    dom_set.Goto step 4.
13. }
14. elseif(SAT1 Query is SAT){
15. enumerated0=
extract values(RANGE, CUT_X) from the trace of SAT1
    Query
16. SAT2 Query:
(values(RANGE, CUT_C)==enumerated0)?
17. if(SAT2 Query is UNSAT){// can not merge RAN-
    DOM to CONSTANT
18. Goto step 5.// try merging to the other constant
19. }
20. elseif(SAT2 Query is SAT){
21. enumerated_set=enumerated_set UNION enumer-
    ated0
22. Goto step 8.
23. }
24. else{return merges;}// SAT2 has TIMED_OUT
25. }
26. else{return merges;}// SAT1 has TIMED_OUT
27. }// constant 0 or 1
28. }
29. return merges.
```

In the process described above, a SAT-solver is used to identify pairs consisting of a dominated input and a constant value, with the property that the corresponding inputs can be merged to the corresponding constants, without changing the range of values producible at the cut-nodes for any possible values of the non-dominated nodes. In essence, the process searches for range values that can be produced before but not after merging a given input RANDOM to a given constant. If such a range value is found, then the RANDOM cannot be merged to that constant. Otherwise, merging that input to that constant can still produce the same traces as before the optimization, and hence this optimization is guaranteed to preserve verification with respect to the selected observables. The process receives a list of cut-nodes, a list of dominated RANDOMs with respect to the cut-nodes, and a list of non-dominated nodes with respect to the cut-nodes. The non-dominated nodes can be either primary inputs, registers or internal gates. The algorithm returns pairs <RANDOM, CONSTANT>, if any exist, such that these RANDOMs can be merged to the specified constant. All of the RANDOMs are iteratively examined for each constant value (either TRUE or FALSE), and for each of the constant values, checks whether that RANDOM can be merged to that constant value.

In line 2 of the above pseudo-code listing, RANGE comprises the set of cut-nodes and the set of non-dominated nodes. In line 3, CUT_X is the copy of the logic that drives RANGE. In line 6, CUT_C effectively creates a copy of the logic with the given RANDOM merged to the given constant value. The portions of CUT_X and CUT_C that do not depend on the given RANDOM are assumed to be equal across the two copies. The process selectively computes an enumerated set of certain values realizable on RANGE. The enumerated set is initially empty. At line 8, a problem is constructed and sent to a SAT-solver SAT1, querying whether there is an assignment that evaluates differently on RANGE in CUT_X and in CUT_C, and that is not already present in the enumerated set. If the SAT1 query is unsatisfiable, then no RANGE values are missed by merging RANDOM to the given CONSTANT, indicating the given RANDOM is safely mergeable to the specified constant. If the given RANDOM is mergeable, the given RANDOM and the corresponding CONSTANT are added to the output list of merges, and the process proceeds to determine if any opportunity exists to merge other RANDOMs. If the SAT1 query is satisfiable, the values realized on RANGE are extracted in the CUT_X copy, and then a check is performed to determine if the same values are also realized in the CUT_C copy (with RANDOM merged to CONSTANT), possibly under a different set of dom_set values. The above check is made by another satisfiability query SAT2. If the SAT2 query is unsatisfiable, then the above range values are unique to the CUT_X copy, proving that the input RANDOM cannot be safely merged to the specified CONSTANT. The process then attempts to merge the given RANDOM to the opposite constant value. Otherwise if the SAT2 query is satisfiable, indicating that the range values can be produced both in CUT_X and CUT_C copies, the range values can be safely removed from comparison in the SAT1 query by adding the range values to enumerated set, and the SAT1 check is repeated. Finally, when there are no more dominated RANDOMs to check for merging, the list of mergeable RANDOMs is returned. Note that in line 11, once a RANDOM is determined to be mergeable to a corresponding constant value, RANDOM is constrained to the corresponding constant value, so any future RANDOM merges identified are guaranteed to be compatible with prior merges.

Figure 4:
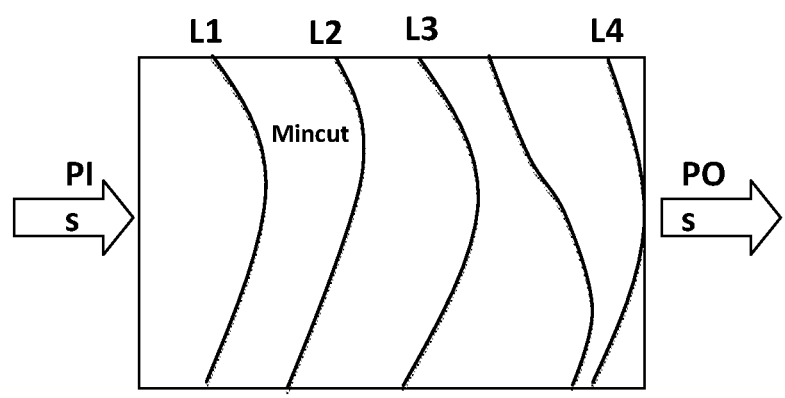
FIG. 4 is a pictorial diagram depicting min-cut analysis partitioning as used in the method of FIG. 5.

A primary advantage of using the above-described algorithm of FIG. 4 to merge inputs to constant (0 or 1), compared to prior techniques is that "trace lifting" becomes extremely efficient. To undo the effects of the merging on a trace obtained on the reduced netlist, further processing merely populates the merged RANDOM into the reduced trace as the merged-to constant for the duration of the trace, and then resimulates the resulting trace over the original netlist to populate the correct values to any other gates that were eliminated by the previous merging. In contrast, existing reparameterization techniques require expensive SAT queries to generate a valid trace from an optimized netlist trace, which is particularly unscalable if the counterexample is very long. For constructing design validity proofs, the results of the processes in the embodiments of the disclosure described above are valid by construction in a manner similar to other reparameterization techniques. The instant algorithm is often very fast, and can easily scale to larger dominator MFFCs than other approaches. However, in practice there are many eliminatable RANDOMs that are not subsumed by single-node dominating cuts. For greater reductions, a multi-node algorithm approach is described below, which identifies a set of dominator nodes (a cut) that collectively dominate more than 2 input RANDOMs, a type of structure that occurs frequently and repeatedly in actual hardware designs.

Figure 5:
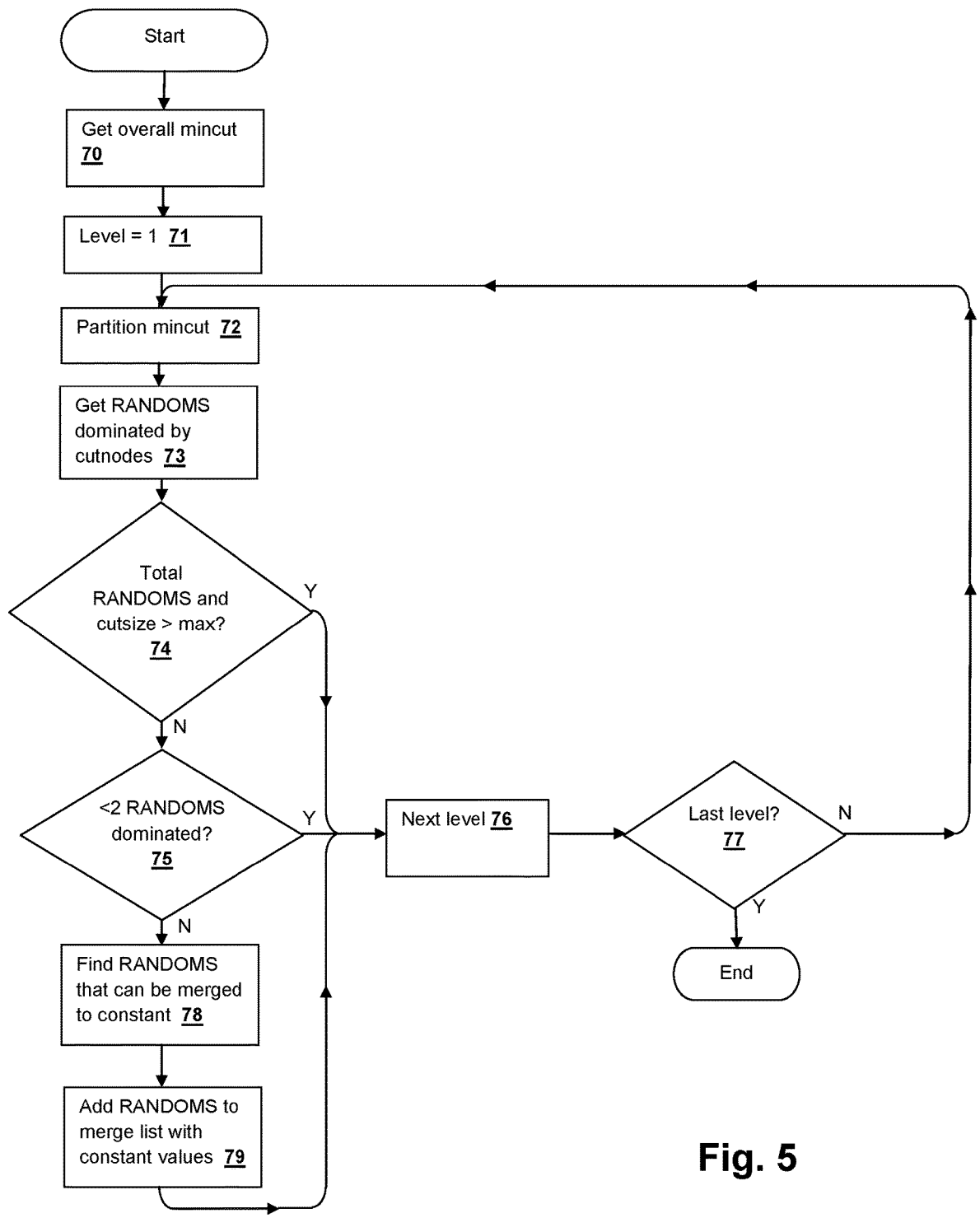
FIG. 5 is a flow chart depicting a method in accordance with another embodiment of the disclosure.

Referring to FIG. 5, a method according to another embodiment of the disclosure is illustrated that processes a plurality of cut-nodes that collectively dominate more than two input RANDOMs. Referring additionally to FIG. 4, for the multi-cut-node process illustrated herein, the partitioning in the multi-node implementation identifies dominating cuts in a levelized manner, starting with shallow levels and gradually considering deeper cuts according to a level increment parameter DOM_LEVEL_INCREMENT as implemented in the pseudo-code listed below. The process computes a min-cut of the netlist, that takes all next state functions, initial value functions, and observables as sinks and RANDOMs as sources. RANDOMs that are present in both sinks and sources are excluded and marked as non-dominated. The process illustrated in FIG. 5 retrieves the overall min-cut (step 70) and commences at level 1 (step 71). The min-cut is partitioned (step 72) and the RANDOMS dominated by the set of cut-nodes (step 73) are retrieved. If the total number of RANDOMs combined with the cut size is greater than a maximum value (decision 74), or if the number of RANDOMs dominated by the set of cut-nodes is less than two (decision 75), then the process moves on to the next level (step 76). Similar to the process described above with reference to FIG. 2, a check is performed to find whether any of the RANDOMs can be merged to a constant (step 78), according to the process illustrated in FIG. 4, and any RANDOMS that are found mergeable are added to the merge list, along with their corresponding constant values (step 79). The process then moves on to the next level (step 76), until the last level has been processed (decision 77).

Min-cutBased_MergeInputsToConstants(Netlist   N, Observables T, MAX_CUT_SIZE, DOM_LEVEL_INCREMENT, MAX_CUT_LEVELS)
1. merged_inputs={ }
2. SINKS=sinks (next state functions)+(initial value functions)+(observables)
3. SOURCES=inputs in N// excludes sink nodes
4. mc=min-cut (SOURCES, SINKS)// the overall min-cut that we will approach in stages
5. mark coi of mc with "cut_flag"
6.   MAX_LEVELS=min(MAX_CUT_LEVELS,max_level(mc))
7. for each level (i=1;i<MAX_LEVELS;i+=DOM_ LEVEL_INCREMENT){
8. SINKS i=enumerate cut flag nodes of level >=1, with an input <level i
9. mc_i=min-cut(SOURCES,SINKS_i)
10. pi=perform_partitioning(mc_i)
11. for each partition pij in pi {
12. if(pij.cut_size>1andpij.cut_size<MAX_CUT_SIZE){
13. dom_set=list of RANDOMS dominated by pij.cut_nodes
14. non_dom_set=list of RANDOMS and registersor other internal gates non-dominated by pij.cut_nodes
15. if(dom_set.size( )<2){Goto step 7. }
16. elseif(dom_set.size( )non_dom_set.size( )+pij.cut_size> MAX_CUT_SIZE){Goto step 7. }
17. else{
18. merges =FindPossibleMergesToConstant(pij.cut_nodes,dom_set,non_dom_set, N');
19. k=0;
20. while(merges.size( )>k){
21. merged_inputs.insert(<merges.var,merges.value>)
22. Merge input merges.var to merges.value in netlist, remove merges.var from SOURCES
23. k+=1
24. }
25. }// number of cut-nodes is in limit for SAT
26. }// if cut size
27. }// for each partition
28. }// for each level
29. return merged_inputs The process described above is an efficient process for multiple-node cut-based dominated input merging. The process proceeds through the levels of the gates present on a path from RANDOMS to observables. The level of a gate is the minimum number gates needed to traverse combinationally from RANDOMs and registers to a given gate, in which RANDOMs and registers will always be in level 0. It is possible to avoid the levelized analysis, taking the min-cut from line 9 of the pseudo-code listed above as the cut to be optimized. However, in practice, much better performance is achieved with a levelized analysis rather than processing the entire min-cut at once, yielding smaller reducible logic cuts that are more efficiently analyzed for reductions given their smaller size, and where earlier shallower reductions enable more efficient reduction of deeper cuts. The process computes a maximum number of levels from any node in the min-cut, to limit the number of analysis iterations, which can also be controlled with the MAX_CUT_LEVELS parameter input to the algorithm. In lines 7 to 10 of the pseudo-code, for each level up to the computed MAX_LEVELS, the process attempts to extract the dominated RANDOM nodes in order to further evaluate the dominated nodes for merging. The process starts with level-1 (though level-1 can also be an input parameter to the process), computes the min-cut(mc_i) with all RANDOMs as sources, and identifies the the nodes in the min-cut as computed in line 4 that are in a level greater than or equal to the current level as sinks. The resulting mc_i often contains disjoint sets of RANDOMs dominated by disjoint sink nodes. A further reduction in computational resources is obtained by partitioning the logic in the above manner, and the merge-check is then called for each partition independently. Based on a structural analysis, partitions are extracted in perform partitioning( ) of line 10, such that mc_i nodes that do not share any dominated RANDOMs in their fan-in cone are separated into different partitions. Similar to the process described with reference to FIG. 2, if the number of cut-nodes is too large, the attempt to reduce such nodes is skipped for overall efficiency. Otherwise, the dominated input and non-dominated gate sets from mc_i are computed and passed to FindPossibleMergesToConstant( ), which is the process described above with reference to FIG. 3. If there are any mergeable RANDOMs, the RANDOMS are merged and extracted from SOURCES, and the process moves on to the next partition or level. Unlike the process illustrated in FIG. 2, each partition can contain more than one dominator node (cut-width >1), which provides greater optimization potential since this approach is applicable to a larger class of logic structures. By including more than one cut-node in the merging portion of the process, the overall process, while still not requiring full range computation, guarantees a reduction of combinational logic size with no risk of increase in logic size, a very fast trace lifting procedure, and lesser netlist perturbation to achieve the desired reductions.

In a "transformation-based verification" system, an original netlist is iteratively transformed into a smaller and simpler netlist through a sequence of synergistic transformations which in the preferred embodiment of the disclosure includes the techniques disclosed above. The resulting smaller netlist is often substantially easier to verify than the original netlist, using any core verification engine. If a property failure is detected, it is important to be able to produce a trace consistent with the original netlist, to enable a verification engineer or logic designer to triage and correct the cause of failure. One complication to this process is that a transformation such as the above-disclosed processes may alter the behavior of certain gates. The generated trace from an optimized netlist will also not contain any values to the RANDOMs that are merged, along with certain fan-out logic from these merged RANDOMs due to subsequent simplifications. In such cases, a lookup is performed on the merged_inputs array and the missing values due to the merged RANDOMs are inserted into the trace obtained on the reduced netlist according to the merged-to constant values.

The above technique provides an extremely scalable trace lifting process in contrast to existing techniques. Re-simulation of the resulting trace on the original netlist after populating merged input values will fully populate all gate values and completely undo the effects of the instant transformation in a very efficient scalable manner. A "transformation-based verification" tool using the techniques disclosed herein can be used to yield small reduced netlists and enable fast trace lifting, and subsequently BDD-based reparameterization can be applied to yield additional heavier-weight RANDOM reductions. The techniques disclosed herein can synergistically improve the efficiency of BDD-based reparameterization, by efficiently yielding certain reductions before applying compute-intensive BDD analysis. Application of the techniques described above have been evaluated to provide 9% early input reduction on average, and in some instances a 30% input reduction can be achieved by using the above-disclosed techniques in a transformation based verification flow.

Figure 6:
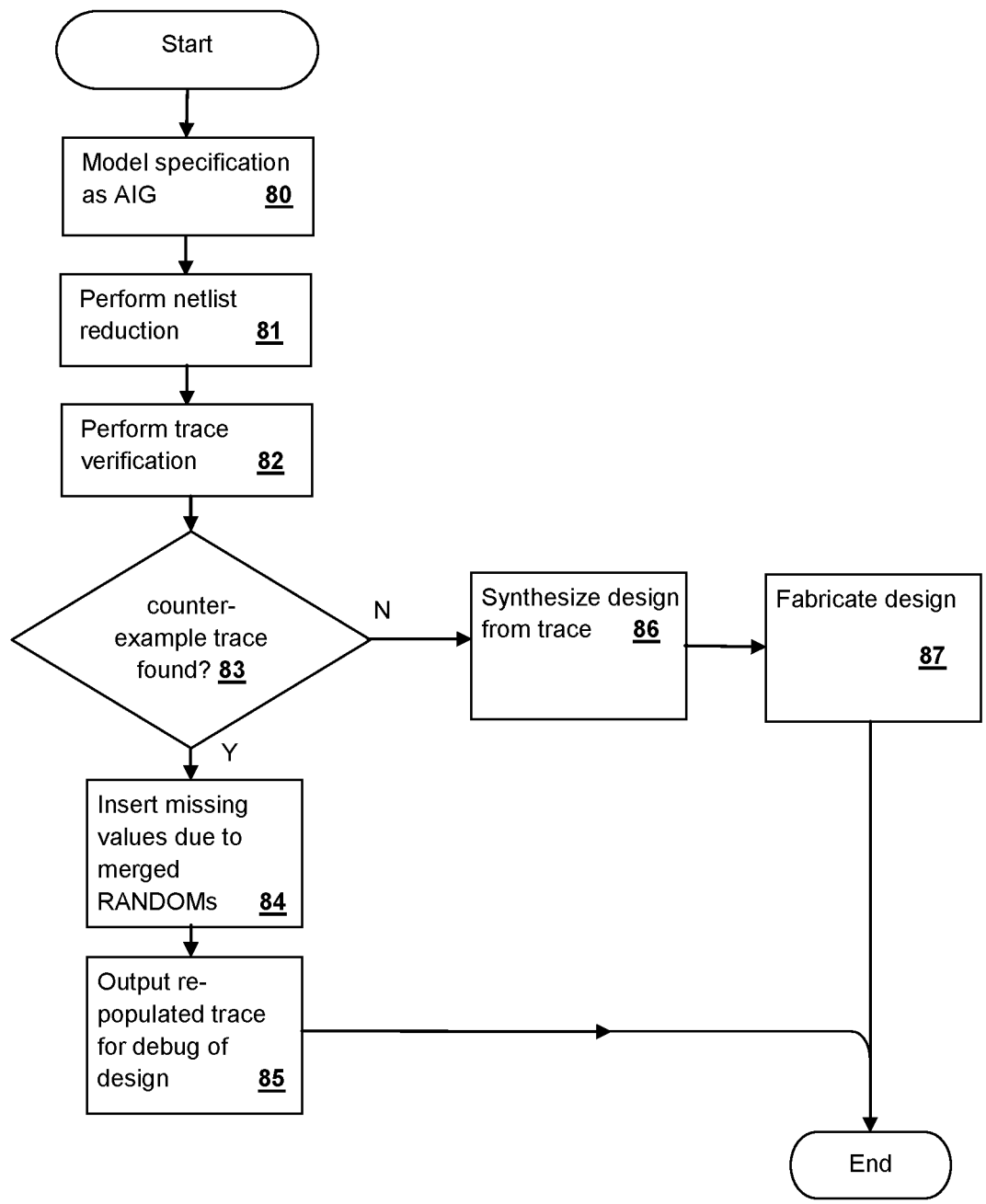
FIG. 6 is a flow chart depicting a method in accordance with another embodiment of the disclosure.

Referring now to FIG. 6, a transformation-based verification and fabrication flow is introduced, according to an embodiment of the disclosure. A logic specification is received and modeled as an AND-Inverter Graph (AIG) (step 80). Either the process illustrated in FIG. 2 or FIG. 5 or both is performed to reduce the netlist describing the logic (step 81). Verification is completed by searching for counter-example traces (step 82). If a counter-example trace is found (decision 83), then missing values from one or more of the RANDOMS that were merged are inserted into the logic to remove the effect of the replacing on the counter-example trace (step 84) and the trace is output for debug of the design (step 85). If verification completes successfully with the merges, i.e., no counter-example trace is found (decision 83), then the logic is processed to synthesize a design (step 86), which is then used to fabricate a physical implementation (step 87), i.e., an integrated circuit or "chip."

Figure 7:
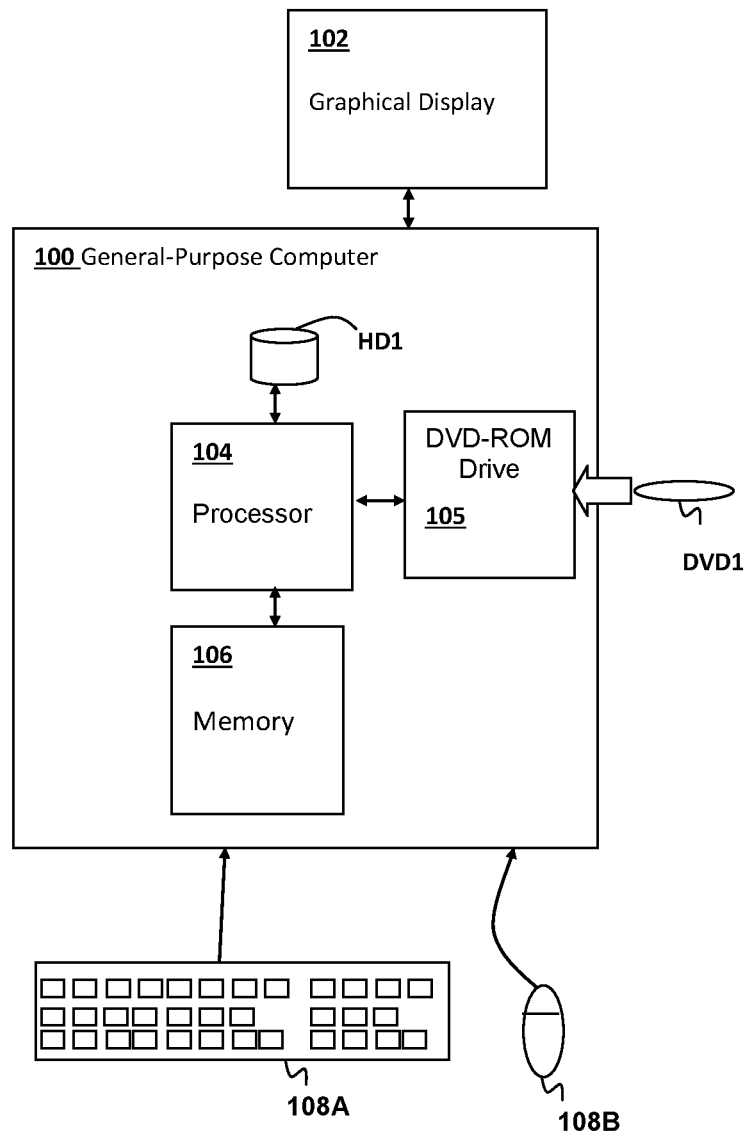
FIG. 7 is a block diagram illustrating a computer system that executes program code according to an embodiment of the disclosure implementing a method according to an embodiment of the invention.

Referring now to FIG. 7, a computer system in which the above-described computer-performed methods are performed, is shown. A general-purpose computer 100 is coupled to a graphical display 102 for display of simulation results, as well as user interface screens for controlling one or more programs including programs forming computer program products including program instructions for carrying out the methods described above. Input devices such as a keyboard 108A and a mouse 108B provide for user interaction with general-purpose computer 100. General-purpose computer 100 includes a processor 104 for executing program instructions stored in a memory 106 including program instructions forming the above-described computer program products in accordance with embodiments of the invention. A removable storage device, such as a DVD-ROM drive 105 is included for accepting storage media such as DVD-ROM DVD1 forming a computer program product in accordance with an embodiment of the invention. The computer system depicted in FIG. 7 is only one example of a computer system such as a desktop computer system or a notebook computer system that can be used to perform the simulations and further processing described above. Other types of computer systems, including distributed and networked computer systems in which some or all of the algorithms and portions thereof are executed remotely are within the scope of the embodiments of the invention as contemplated herein, and the system depicted in FIG. 7 should not be construed as limiting the type of computer system or computer program products that form embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
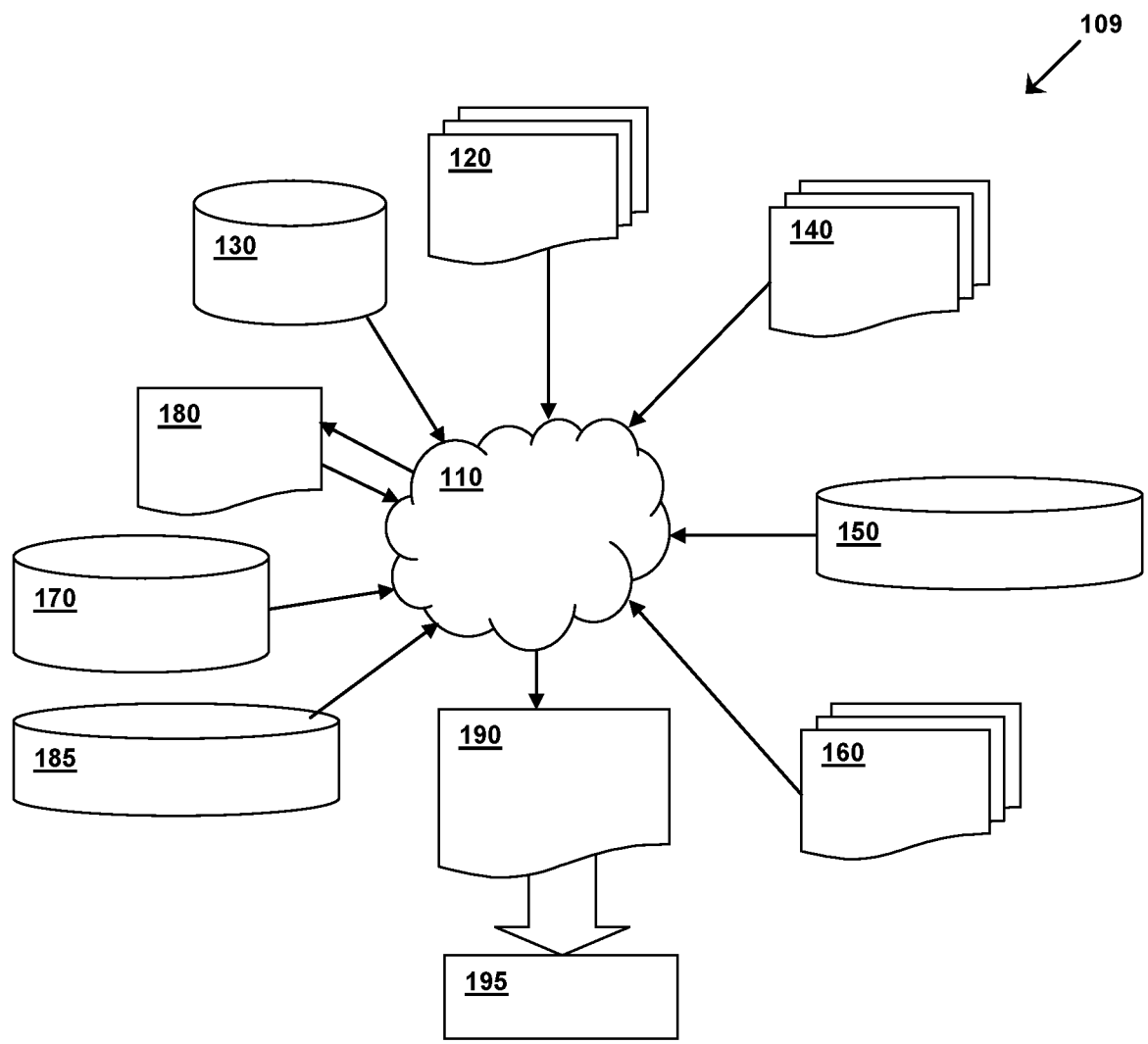
FIG. 8 is a flow diagram of a design process that can be used to fabricate, manufacture and test an integrated circuit according to the methods of FIGS. 3-6.

FIG. 8 shows a block diagram of an exemplary design flow 109 used for example, in semiconductor IC logic design, simulation, test, layout, and manufacture. Design flow 109 includes processes, machines and/or mechanisms for processing design structures or devices to generate logically or otherwise functionally equivalent representations of the design structures and/or devices described above and shown in FIGS. 1-5. The design structures processed and/or generated by design flow 109 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 109 may vary depending on the type of representation being designed. For example, a design flow 109 for building an application specific IC (ASIC) may differ from a design flow 109 for designing a standard component or from a design flow 109 for instantiating the design into a programmable array, for example a programmable gate array (PGA) or a field programmable gate array (FPGA) offered by Altera Inc. or Xilinx, Inc.

FIG. 8 illustrates multiple such design structures including an input design structure 120 that is preferably processed by a design process 110. Input design structure 120 may be a logical simulation design structure generated and processed by design process 110 to produce a logically equivalent functional representation of a hardware device. Input design structure 120 may also or alternatively comprise data and/or program instructions that when processed by design process 110, generate a functional representation of the physical structure of a hardware device. Whether representing functional and/or structural design features, input design structure 120 may be generated using electronic computer-aided design (ECAD) such as implemented by a core developer/designer. When encoded on a machine-readable data transmission, gate array, or storage medium, input design structure 120 may be accessed and processed by one or more hardware and/or software modules within design process 110 to simulate or otherwise functionally represent an electronic component, circuit, electronic or logic module, apparatus, device, or system such as those shown in FIGS. 1-5. As such, input design structure 120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 110 preferably employs and incorporates hardware and/or software modules for synthesizing, translating, or otherwise processing a design/simulation functional equivalent of the components, circuits, devices, or logic structures shown in FIGS. 1 and 4 and optimized by the processes of FIGS. 2-3 and 5 to generate a Netlist 180 which may contain design structures such as input design structure 120. Netlist 180 may comprise, for example, compiled or otherwise processed data structures representing a list of wires, discrete components, logic gates, control circuits, devices, models, etc. that describes the connections to other elements and circuits in an integrated circuit design. Netlist 180 may be synthesized using an iterative process in which netlist 180 is resynthesized one or more times depending on design specifications and parameters for the device. As with other design structure types described herein, netlist 180 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 110 may include hardware and software modules for processing a variety of input data structure types including Netlist 180. Such data structure types may reside, for example, within library elements 130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 140, characterization data 150, verification data 160, design rules 170, and test data files 185 which may include input test patterns, output test results, and other testing information. Design process 110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 110 without deviating from the scope and spirit of the invention. Design process 110 may also include modules for performing standard circuit design processes such as timing analysis, verification, design rule checking, place and route operations, etc.

Design process 110 employs and incorporates logic and physical design tools such as HDL compilers and simulation model build tools to process input design structure 120 together with some or all of the depicted supporting data structures along with any additional mechanical design or data (if applicable), to generate a second design structure 190. Design structure 190 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to input design structure 120, design structure 190 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-5. In one embodiment, design structure 190 may comprise a compiled, executable HDL simulation model that functionally simulates the devices shown in FIGS. 1-5.

Design structure 190 may also employ a data format used for the exchange of layout data of integrated circuits and/or symbolic data format (e.g. information stored in a GDSII (GDS2), GL1, OASIS, map files, or any other suitable format for storing such design data structures). Design structure 190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-5. Design structure 190 may then proceed to a stage 195 where, for example, design structure 190: proceeds to tape-out, is released to manufacturing, is released to a mask house, is sent to another design house, is sent back to the customer, etc.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer performed method performed by a general-purpose computer system that verifies equivalence of a logic design, the method comprising:

within the computer system, first identifying a set of one or more cut-nodes, wherein the one or more cut-nodes are output nodes of corresponding partitions of a logic representation in a memory of the computer system that represents the logic design, wherein the one or more cut-nodes each or together dominate at least two corresponding RANDOMS that are input to the corresponding partitions of the logic;

within the computer system, responsive to first identifying the set of one or more cut-nodes, second identifying a set of RANDOMS corresponding to a given cut-node that can individually be merged to either FALSE or TRUE without altering a range of values producible at the given cut-node over non-dominated RANDOMS, along with identifying a constant corresponding to FALSE or TRUE for individual ones of the identified set of RANDOMS for the corresponding cut-node;

responsive to identifying the set of RANDOMS that can be merged, replacing the individual RANDOMS within the identified set of RANDOMS with the corresponding constant for the individual RANDOMS in the corresponding partition of the logic represented in the memory of the computer system, to merge the identified RANDOMS to reduce the number of the input RANDOMS to the corresponding partition of the logic; and completing verification of the logic across non-dominated RANDOMS and non-merged RANDOMS to verify the logic.

2. The method of claim 1, wherein the set of one or more cut-nodes consists of a single cut-node, and wherein the first identifying, the second identifying and the replacing are repeated for additional single cut-nodes corresponding to additional partitions of the logic in order to reduce the number of input RANDOMS to the additional partitions of the logic prior to completing verification of the logic.

3. The method of claim 1, wherein the set of one or more cut-nodes comprises a plurality of cut-nodes, wherein the second identifying identifies a set of RANDOMS across the plurality of cut-nodes that can individually be merged to either FALSE or TRUE without altering a range of values producible over the set of cut-nodes over non-dominated RANDOMS, along with identifying a constant corresponding to FALSE or TRUE for individual ones of the identified set of RANDOMS for the set of cut-nodes, and wherein the replacing replaces the identified RANDOMS within the identified set of RANDOMS with the corresponding constant for the individual ones of the identified set of RANDOMS in the partitions of the logic represented in the memory of the computer system corresponding to the plurality of cut-nodes, to merge the identified RANDOMS to reduce the number of the input RANDOMS to the corresponding partitions of the logic.

4. The method of claim 1, wherein the second identifying comprises:

first performing a first satisfiability check on the given cut-node with a first one of the set of RANDOMS set to a first constant value to determine whether a range of output values for the given cut-node has been reduced by setting the first one of the RANDOMS to the first constant value;

responsive to a result of the first satisfiability check indicating that the range of output values was reduced, performing a second satisfiability check on the given cut-node with the first one of the set of RANDOMS set to a second constant value having a logic state opposite that of the first constant value, whether the range of output values for the given cut-node has been reduced by setting the first one of the RANDOMS to the second constant value;

responsive to the result of the first satisfiability check indicating that the range of output values was not reduced, terminating identification of the first one of the set of RANDOMS without performing the second satisfiability check and adding the first one of the set of RANDOMS to the set of identified RANDOMS along with the first constant value;

responsive to the result of the second satisfiability check indicating that the range of output values was not reduced, adding the first one of the set of RANDOMS to the set of identified RANDOMS along with the second constant value; and responsive to completion of the second satisfiability check, terminating identification of the first one of the set of RANDOMS.

5. The method of claim 4, wherein the second identifying further comprises:

third performing a third satisfiability check on the given cut-node with a second one of the set of RANDOMS set to the first constant value to determine whether a range of output values for the given cut-node has been reduced by setting the second one of the RANDOMS to the first constant value;

responsive to a result of the third satisfiability check indicating that the range of output values was reduced, performing a fourth satisfiability check on the given cut-node with the second one of the set of RANDOMS set to the second constant value;

responsive to the result of the third satisfiability check indicating that the range of output values was not reduced, terminating identification of the second one of the set of RANDOMS without performing the fourth satisfiability check and adding the second one of the set of RANDOMS to the set of identified RANDOMS along with the first constant value;

responsive to the result of the fourth satisfiability check indicating that the range of output values was not reduced, adding the second one of the set of RANDOMS to the set of identified RANDOMS along with the second constant value; and responsive to completion of the second satisfiability check, terminating identification of the second one of the set of RANDOMS.

6. The method of claim 1, further comprising:

responsive to successful verification of the logic, synthesizing a design from the logic as optimized by the replacing; and fabricating a physical circuit from the synthesized design.

7. The method of claim 1, further comprising:

responsive to unsuccessful verification of the logic, obtaining a counter-example trace;

inserting missing values from one or more of the RANDOMS that were merged by the replacing into the logic to remove the effect of the replacing on the counter-example trace and generate a resulting trace; and re-simulating the resulting trace to recommence a process of verification of the logic.

8. A computer system comprising a processor for executing program instructions coupled to a memory for storing the program instructions, wherein the program instructions are program instructions for simulating a logic design, wherein the program instructions comprise program instructions for:

within the computer system, first identifying a set of one or more cut-nodes, wherein the one or more cut-nodes are output nodes of corresponding partitions of a logic represented in a memory of the computer system, wherein the one or more cut-nodes each or together dominate at least two corresponding RANDOMS that are input to the corresponding partitions of the logic;

within the computer system, responsive to first identifying the set of one or more cut-nodes, second identifying a set of RANDOMS corresponding to a given cut-node that can individually be merged to either FALSE or TRUE without altering a range of values producible at the given cut-node over non-dominated RANDOMS, along with identifying a constant corresponding to FALSE or TRUE for individual ones of the identified set of RANDOMS for the corresponding cut-node;

responsive to identifying the set of RANDOMS that can be merged, replacing the individual RANDOMS within the identified set of RANDOMS with the corresponding constant for the individual RANDOMS in the corresponding partition of the logic represented in the memory of the computer system, to merge the identified RANDOMS to reduce the number of the input RANDOMS to the corresponding partition of the logic;

completing verification of the logic across non-dominated RANDOMS and non-merged RANDOMS to verify the logic; and responsive to successful verification of the logic, fabricating an integrated circuit from a design of the logic.

9. The computer system of claim 8, wherein the set of one or more cut-nodes consists of a single cut-node, and wherein the program instructions first identifying, the second identifying and the replacing are repeatedly executed for additional single cut-nodes corresponding to additional partitions of the logic in order to reduce the number of input RANDOMS to the additional partitions of the logic prior to completing verification of the logic.

10. The computer system of claim 9, wherein the set of one or more cut-nodes comprises a plurality of cut-nodes, wherein the program instructions for second identifying identify a set of RANDOMS across the plurality of cut-nodes that can individually be merged to either FALSE or TRUE without altering a range of values producible over the set of cut-nodes over non-dominated RANDOMS, along with identifying a constant corresponding to FALSE or TRUE for individual ones of the identified set of RANDOMS for the set of cut-nodes, and wherein the program instructions for replacing replace the identified RANDOMS within the identified set of RANDOMS with the corresponding constant for the individual ones of the identified set of RANDOMS in the partitions of the logic represented in the memory of the computer system corresponding to the plurality of cut-nodes, to merge the identified RANDOMS to reduce the number of the input RANDOMS to the corresponding partitions of the logic.

11. The computer system of claim 8, wherein the program instructions for second identifying comprise program instructions for:
    first performing a first satisfiability check on the given cut-node with a first one of the set of RANDOMS set to a first constant value to determine whether a range of output values for the given cut-node has been reduced by setting the first one of the RANDOMS to the first constant value;
    responsive to a result of the first satisfiability check indicating that the range of output values was reduced, performing a second satisfiability check on the given cut-node with the first one of the set of RANDOMS set to a second constant value having a logic state opposite that of the first constant value, whether the range of output values for the given cut-node has been reduced by setting the first one of the RANDOMS to the second constant value;
    responsive to the result of the first satisfiability check indicating that the range of output values was not reduced, terminating identification of the first one of the set of RANDOMS without performing the second satisfiability check and adding the first one of the set of RANDOMS to the set of identified RANDOMS along with the first constant value;
    responsive to the result of the second satisfiability check indicating that the range of output values was not reduced, adding the first one of the set of RANDOMS to the set of identified RANDOMS along with the second constant value; and
    responsive to completion of the second satisfiability check, terminating identification of the first one of the set of RANDOMS.

12. The computer system of claim 11, wherein the program instructions for second identifying further comprise program instructions for:
    third performing a third satisfiability check on the given cut-node with a second one of the set of RANDOMS set to the first constant value to determine whether a range of output values for the given cut-node has been reduced by setting the second one of the RANDOMS to the first constant value;
    responsive to a result of the third satisfiability check indicating that the range of output values was reduced, performing a fourth satisfiability check on the given cut-node with the second one of the set of RANDOMS set to the second constant value;
    responsive to the result of the third satisfiability check indicating that the range of output values was not reduced, terminating identification of the second one of the set of RANDOMS without performing the fourth satisfiability check and adding the second one of the set of RANDOMS to the set of identified RANDOMS along with the first constant value;
    responsive to the result of the fourth satisfiability check indicating that the range of output values was not reduced, adding the second one of the set of RANDOMS to the set of identified RANDOMS along with the second constant value; and
    responsive to completion of the second satisfiability check, terminating identification of the second one of the set of RANDOMS.

13. The computer system of claim 8, wherein the program instructions further comprise program instructions for responsive to successful verification of the logic, synthesizing a design from the logic as optimized by the replacing.

14. The computer system of claim 8, wherein the program instructions further comprise program instructions for:
    responsive to unsuccessful verification of the logic, obtaining a counter-example trace;
    inserting missing values from one or more of the RANDOMS that were merged by the replacing into the logic to remove the effect of the replacing on the counter-example trace and generate a resulting trace; and
    re-simulating the resulting trace to recommence a process of verification of the logic.

15. A computer program product comprising a computer-readable storage medium storing program instructions for execution by a general-purpose computer system, wherein the program instructions are program instructions for simulating a logic design, wherein the program instructions comprise program instructions for:
    within the computer system, first identifying a set of one or more cut-nodes, wherein the one or more cut-nodes are output nodes of corresponding partitions of a logic represented in a memory of the computer system, wherein the one or more cut-nodes each or together dominate at least two corresponding RANDOMS that are input to the corresponding partitions of the logic;
    within the computer system, responsive to first identifying the set of one or more cut-nodes, second identifying a set of RANDOMS corresponding to a given cut-node that can individually be merged to either FALSE or TRUE without altering a range of values producible at the given cut-node over non-dominated RANDOMS, along with identifying a constant corresponding to FALSE or TRUE for individual ones of the identified set of RANDOMS for the corresponding cut-node;
    responsive to identifying the set of RANDOMS that can be merged, replacing the individual RANDOMS within the identified set of RANDOMS with the corresponding constant for the individual RANDOMS in the corresponding partition of the logic represented in the memory of the computer system, to merge the identified RANDOMS to reduce the number of the input RANDOMS to the corresponding partition of the logic;
    completing verification of the logic across non-dominated RANDOMS and non-merged RANDOMS to verify the logic; and
    responsive to successful verification of the logic, fabricating an integrated circuit from a design of the logic.

16. The computer program product of claim 15, wherein the set of one or more cut-nodes consists of a single cut-node, and wherein the program instructions first identifying, the second identifying and the replacing are repeatedly executed for additional single cut-nodes corresponding to additional partitions of the logic in order to reduce the number of input RANDOMS to the additional partitions of the logic prior to completing verification of the logic.

17. The computer program product of claim 15, wherein the set of one or more cut-nodes comprises a plurality of cut-nodes, wherein the program instructions for second identifying identify a set of RANDOMS across the plurality of cut-nodes that can individually be merged to either FALSE or TRUE without altering a range of values producible over the set of cut-nodes over non-dominated RANDOMS, along with identifying a constant corresponding to FALSE or TRUE for individual ones of the identified set of RANDOMS for the set of cut-nodes, and wherein the program instructions for replacing replace the identified RANDOMS within the identified set of RANDOMS with the corresponding constant for the individual ones of the identified set of RANDOMS in the partitions of the logic represented in the memory of the computer system corresponding to the plurality of cut-nodes, to merge the identified RANDOMS to reduce the number of the input RANDOMS to the corresponding partitions of the logic.

18. The computer program product of claim 15, wherein the program instructions for second identifying comprise program instructions for:

first performing a first satisfiability check on the given cut-node with a first one of the set of RANDOMS set to a first constant value to determine whether a range of output values for the given cut-node has been reduced by setting the first one of the RANDOMS to the first constant value;

responsive to a result of the first satisfiability check indicating that the range of output values was reduced, performing a second satisfiability check on the given cut-node with the first one of the set of RANDOMS set to a second constant value having a logic state opposite that of the first constant value, whether the range of output values for the given cut-node has been reduced by setting the first one of the RANDOMS to the second constant value;

responsive to the result of the first satisfiability check indicating that the range of output values was not reduced, terminating identification of the first one of the set of RANDOMS without performing the second satisfiability check and adding the first one of the set of RANDOMS to the set of identified RANDOMS along with the first constant value;

responsive to the result of the second satisfiability check indicating that the range of output values was not reduced, adding the first one of the set of RANDOMS to the set of identified RANDOMS along with the second constant value; and responsive to completion of the second satisfiability check, terminating identification of the first one of the set of RANDOMS.

19. The computer program product of claim 15, wherein the program instructions for second identifying further comprise program instructions for:

third performing a third satisfiability check on the given cut-node with a second one of the set of RANDOMS set to the first constant value to determine whether a range of output values for the given cut-node has been reduced by setting the second one of the RANDOMS to the first constant value;

responsive to a result of the third satisfiability check indicating that the range of output values was reduced, performing a fourth satisfiability check on the given cut-node with the second one of the set of RANDOMS set to the second constant value;

responsive to the result of the third satisfiability check indicating that the range of output values was not reduced, terminating identification of the second one of the set of RANDOMS without performing the fourth satisfiability check and adding the second one of the set of RANDOMS to the set of identified RANDOMS along with the first constant value;

responsive to the result of the fourth satisfiability check indicating that the range of output values was not reduced, adding the second one of the set of RANDOMS to the set of identified RANDOMS along with the second constant value; and responsive to completion of the second satisfiability check, terminating identification of the second one of the set of RANDOMS.

20. The computer program product of claim 15, wherein the program instructions further comprise program instructions for:

responsive to unsuccessful verification of the logic, obtaining a counter-example trace;

inserting missing values from one or more of the RANDOMS that were merged by the replacing into the logic to remove the effect of the replacing on the counter-example trace and generate a resulting trace; and re-simulating the resulting trace to recommence a process of verification of the logic.

* * * * *